United States Patent [19]

Eguchi et al.

[11] Patent Number: 5,021,201
[45] Date of Patent: Jun. 4, 1991

[54] PROCESS FOR PREPARING UNIFORM DISCOID PARTICLES

[75] Inventors: Tamiyuki Eguchi; Michito Tsunomori, both of Kobe, Japan

[73] Assignee: Kanegafuchi Kagaku Kogyo Kabushiki Kaisha, Osaka, Japan

[21] Appl. No.: 433,102

[22] Filed: Nov. 9, 1989

Related U.S. Application Data

[62] Division of Ser. No. 113,701, Oct. 28, 1987, abandoned.

[30] Foreign Application Priority Data

Oct. 31, 1986 [JP] Japan .................. 61-261519

[51] Int. Cl.$^5$ .................. B01J 13/00; B29B 9/02
[52] U.S. Cl. .................. 264/9; 252/315.01; 252/315.1; 252/315.6; 252/315.7; 264/10; 428/402; 521/29; 536/76
[58] Field of Search .......... 252/315.1, 315.6, 315.7, 252/315.01; 264/9, 10, 13; 428/402; 521/29; 536/76

[56] References Cited

U.S. PATENT DOCUMENTS

| | | | |
|---|---|---|---|
| 2,412,958 | 12/1946 | Bates et al. | 252/315.5 |
| 2,457,091 | 12/1948 | Schlesman | 252/315.5 |
| 2,647,875 | 8/1953 | Marisic | 252/315.5 |
| 3,060,510 | 10/1962 | Fischer et al. | 264/9 |
| 3,066,065 | 11/1962 | Koerner et al. | 162/138 |
| 3,702,748 | 11/1972 | Storb et al. | 264/13 X |
| 4,069,045 | 1/1978 | Lundgren | 75/251 |
| 4,162,282 | 7/1979 | Fulwyler et al. | 264/9 |
| 4,166,147 | 8/1979 | Lange et al. | 428/328 |
| 4,285,645 | 8/1981 | Bezzi et al. | 425/6 |
| 4,302,166 | 11/1981 | Fulwyler et al. | 425/6 |
| 4,347,200 | 8/1982 | Bezzi et al. | 264/9 |
| 4,436,782 | 1/1984 | Ho | 428/402 |
| 4,537,733 | 8/1985 | Farago | 264/9 |
| 4,559,000 | 12/1985 | Froeschke | 425/6 |
| 4,634,725 | 1/1987 | Tsujii et al. | 523/221 |
| 4,686,269 | 8/1987 | Tokunaga et al. | 526/336 |
| 4,902,792 | 2/1990 | Okuma et al. | 428/402 X |

FOREIGN PATENT DOCUMENTS

| | | |
|---|---|---|
| 134944 | 6/1984 | European Pat. Off. |
| 235603 | 9/1987 | European Pat. Off. |
| 1327272 | 4/1962 | France . |
| 2240046 | 7/1975 | France . |
| 50-72877 | 6/1975 | Japan . |
| 62-191033 | 8/1987 | Japan . |
| 1476923 | 6/1977 | United Kingdom . |

OTHER PUBLICATIONS

Proc. ICLASS-1982, 37 (1982), Uniform Size Droplets by Longitudinal Vibration of Newtonian and Non-Newtonian Fluids.
Proc. ICLASS-1982 47 (1982), Production of Monodispersed Drops by Forced Longitudinal Vibration of Liquid Art.
Rev. Sci. Instr., 35, 1349 (1964), Source of Uniform-Sized Liquid Droplets*.

Primary Examiner—Richard D. Lovering
Attorney, Agent, or Firm—Armstrong, Nikaido, Marmelstein, Kubovcik & Murray

[57] ABSTRACT

Uniform discoid particles made of at least one member selected from the group consisting of a natural high molecular substance, a synthetic high molecular substance and an inorganic compound, wherein each particle has a diameter of 20 to 2,000 μm and a thickness/diameter ratio of ½ to 1/50, and not less than 80% of the whole particles have a diameter within the range of 0.5 to 2 times the number average diameter, and a process for preparing the particles. The discoid particle of the present invention has a larger surface area and therefore has a high efficiency when employed in various uses such as a parent material for an ion exchange resin, a packing material for a chromatograph, a catalyst and an culture medium for cell culture in comparison with conventional spherical particle.

2 Claims, 1 Drawing Sheet

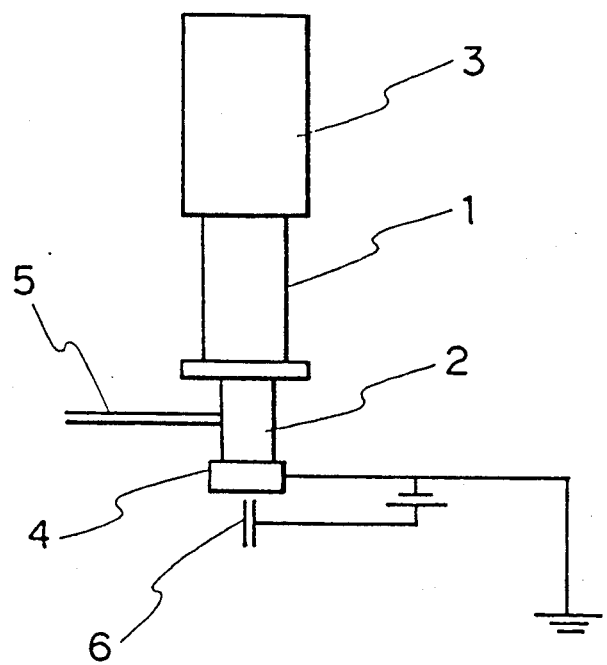
FIG.1
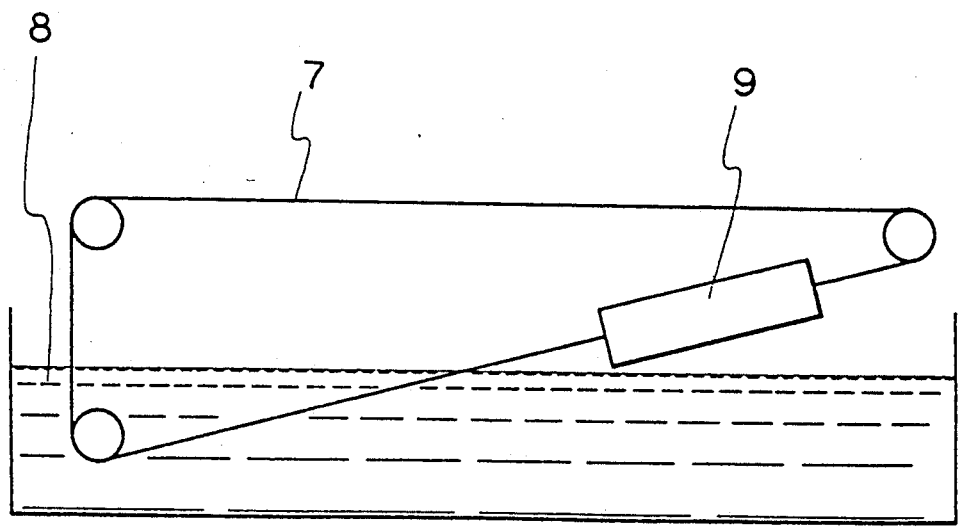

PROCESS FOR PREPARING UNIFORM DISCOID PARTICLES

This is a division of application Ser. No. 113,701 filed 10/28/87, now abandoned.

BACKGROUND OF THE INVENTION

The present invention relates to uniform discoid particles which can be used as a parent material for an ion exchange resin, a packing material for a chromatography, a culture medium for a cell culture or a catalyst, and relates to a process for preparing the particulate material.

There has been hitherto unknown uniform discoid particles, in which the particles are uniform in size and form, or a process for preparing it, while there has been known spherical particles and a process of preparing them.

In recent years, there is required a technique for precise separation and purification, particularly in biochemical industry, and a chromatography increasingly becomes an indispensable operation.

The separation efficiency of chromatography increases with increasing the total surface area of packing particles per unit volume of the column. Hitherto, the particle size of packing particles is lowered, in order to increase the total surface area of packing particles per unit volume. However, as the particle size is lowered, the classification becomes difficult, the cost becomes high, and it becomes difficult to remove minuter particles which are liable to contaminate a liquid to be treated.

On the other hand, there has been developed a new technique for a cell culture in which a suspended particles is used as a culture medium. In this culture medium, as the total surface area of suspended particles per unit volume of the suspension increases, the number of cultured cells increases. Hitherto, the particle size of suspended particles is lowered in order to increase the total surface area of suspended particles per unit volume of the suspension. However, for cultured cells, it is preferable that a medium has a surface area large to some extent.

As described above, when the particle size of packing particles or suspended particles is lowered in order to increase the total surface area of them per unit volume, problems arise.

Therefore, in order not to cause such problems or other problems, the total surface area should be increased, not by lowering the particle size, but by changing the form of particle so as to increase the surface area of each particle itself.

An object of the present invention is to provide particles having a specific form in order to increase the surface area of each particle without lowering the particle size.

SUMMARY OF THE INVENTION

In accordance with the present invention, there is provided uniform discoid particles made of at least one member selected from the group consisting of a natural high molecular substance, a synthetic high molecular substance and an inorganic compound, wherein each particle has a diameter of 20 to 2,000 $\mu$m and a thickness/diameter ratio of $\frac{1}{2}$ to 1/50, and not less than 80% of the whole particles have a diameter within the range of 0.5 to 2 times the number average diameter.

In accordance with the present invention, there is also provided a process for preparing the above uniform discoid particles, which comprises jetting a solution in the form of uniform droplets with electric charges with a same sign, the solution containing at least one member selected from the group consisting of a natural high molecular substance, a synthetic high molecular substance, an inorganic compound and an organometal compound and having a viscosity of 20 to 2,000 cP, from an orifice into a gas atmosphere at a constant flow rate while applying cyclic turbulences having a constant frequency to the solution; letting the droplets adhere to a flat and smooth surface before the droplets coagulate; and coagulating the droplets adhered to the surface by subjecting the droplets to the drying or to the contact with a coagulating liquid.

BRIEF DESCRIPTION OF THE DRAWING

FIG. 1 is an diagramatic illustration of an apparatus for preparing the particles of the present invention, embodying the process of the present invention.

DETAILED DESCRIPTION

Typical examples of the natural high molecular substances used in the present invention are, for instance, cellulose, silk, collagen, chitin, alginic acid, cellulose derivatives, and the like. Typical examples of the synthetic high molecular substances are, for instance, vinyl polymers such as polyvinyl alcohol, ethylene-vinyl alcohol copolymer, polyvinyl acetate, polymethyl methacrylate, polystyrene, styrene-butadiene copolymer and styrene-chloromethylated styrene copolymer; condensation polymers such as polyamides, polyesters and polyurethanes; and the like. Typical examples of the inorganic compounds are, for instance, metal hydroxide sols and metal oxide sols such as alumina sol, silica sol and aluminum hydroxide sol, and the like. Typical examples of organometal compounds are compounds soluble in a organic solvent, e.g. metal alkoxide and the like. However, examples of the compounds used in the present invention are not limited thereto.

Each discoid particle of the present invention has a diameter of 20 to 2,000 $\mu$m, preferably 50 to 1,000 $\mu$m, and a thickness/diameter ratio of $\frac{1}{2}$ to 1/50. In the discoid particles of the present invention, not less than 80% of the whole particles have a diameter within the range of 0.5 to 2 times, preferably $\pm$20% of the number average diameter.

In case the each discoid particle has a diameter of less than 20 $\mu$m, it is difficult to prepare particles uniform in form. In case the particle has a diameter of more than 2,000 $\mu$m, the particles are liable to damage. Both cases are unpreferable.

In case the each discoid particle has a thickness/diameter ratio of more than $\frac{1}{2}$, the effect of making the surface area of the particle large is not sufficient. In case the each discoid particle has a thickness/diameter ratio of less than 1/50, the thickness of particle is too thin and therefore the mechanical strength or particle is weak. Both cases are unpreferable.

Further, in case less than 80% of the whole particles have a diameter within the range of 0.5 to 2 times the number average diameter, a classification process is usually required. And consequently, not only the yield becomes low, but also, when the particles are used for a chromatography, the separation property is liable to be unstable.

The term "diameter" used herein means the diameter or, in case the particle is not a perfect round shape, the maximum diameter of a discoid particle when observed by means of an optical microscope or an electron microscope. The term "thickness" used herein means the maximum thickness of a discoid particle when observed by means of an optical microscope or an electron microscope. Further, the term "number average diameter" used herein means the number average diameter of 500 discoid particles when photographed using an optical microscope or an electron microscope.

Hereinafter, there is described a process for preparing the uniform discoid particles of the present invention.

The uniform discoid particles of the present invention are prepared by using a solution containing at least one member selected from the group consisting of the aforementioned natural high molecular substance, synthetic high molecular substance, inorganic compound and organometal compound.

The concentration, the kind of solvent, the preparation process, or the like of the solution is not particularly limited. By jetting the solution from an orifice into a gas atmosphere at a constant flow rate while applying a cyclic turbulences at a constant frequency to the solution, uniform droplets are obtained.

In order to obtain uniform droplets, as described in a patent application by the present inventors [Japanese Unexamined Patent Publication (Tokkyo Kokai) No. 191033/1987], the viscosity and surface tension of solution, the flow rate of the solution jetted from an orifice, the size of the orifice, and the frequency and displacement of vibration generating the cyclic turbulences, these parameters being mutually related, should be adjusted in a specific range (hereinafter the condition that these parameters are adjusted in the specific range is referred to as "synchronized condition").

Among the properties of the solution, the viscosity is greatly changed according to the kind of solute or the concentration of solution. Therefore, to attain the synchronized condition, an attention should be paid particularly to the viscosity. When the viscosity of the solution is too high, the solution jetted from an orifice in a cylindrical form is not uniformly cut, namely the synchronized condition cannot be attained. In the present invention, the upper limit of the viscosity is about 2,000 cP, though it is changed according to other properties of the solution as described above. Also the solution used in the present invention should contain a high molecular substance, an inorganic compound and the like, or mixture containing more than one kinds thereof, at a concentration of at least several % by weight in order to obtain discoid particles having a practical strength from the solution. Such solution usually has a viscosity at least about 20 cP.

The orifice is usually a round shape pore. In the present invention, an orifice having a diameter of the hole of about 5 to 500 $\mu$m is used.

Once the solution and the size of the orifice are determined, other parameters described above, i.e. the flow rate of the solution, and the frequency and displacement of the vibration generating cyclic turbulences are determined so as to attain the synchronized condition through trial and error. For instance, in order to obtain uniform droplets having a diameter not more than 250 $\mu$m, there may be employed a process described in a prior patent application by the present inventors [Japanese Unexamined Patent Publication (Tokkyo Kokai) No. 191033/1987]. Droplets having a diameter more than 250 $\mu$m can be obtained according to the processes described in T. Sakai, Proc. ICLASS-1982, 37 (1982); P. Shummer, Proc. ICLASS-1982, 47 (1982); Japanese Unexamined Patent Publication (Tokkyo Kokai) No. 72877/1975; and the like. Also, it is possible to obtain discoid particles having some layers by using a multiple ring nozzle as desclosed in Japanese Unexamined Patent Publication (Tokkyo Kokai) No. 129686/1977.

When the droplets is small, the distance between the droplets is small and the droplets move at random by air resistance, and consequently the droplets are liable to collide and reconnect with each other. In such case, the collision and the reconnection of the droplets can be prevented for a relatively long time by electrifying each of the droplets with a same sign, according to the process as desclosed in J. M. Schneider and C. D. Hendricks, Rev. Sci. Instr., 35, 1349 (1964).

According to the above-described process, uniform droplets with a very narrow diameter distribution, nearly mono-disperse particles can be obtained.

Discoid particles almost uniform in diameter, thickness and shape of the surface can be obtained by letting the droplets adhere to a flat and smooth surface before the droplets coagulate, i.e. while the droplets are in a solution state, the surface preferably having the electric charge opposite to that of droplets, or the surface being grounded, and coagulating the droplets by subjecting the droplets to drying or to the contact with a coagulating liquid. The diameter, thickness and shape of the surface are determined by the flying rate of the droplets when the droplets collide with the surface, the diameter of the droplets, the gravity, the viscosity of the droplets, the surface tension of the droplets and the flat and smooth surface, the time for coagulating the droplets, and the like.

Though there is no particular limitation in the drying method, the kind of coagulating liquid, the method for contact of the droplets and the coagulating liquid, and the like, when the droplets is subjected to the contact with the coagulating liquid, the coagulating liquid which is miscible with the solvent of the droplets, and is a non-solvent of the high molecular substances, the inorganic compounds or the like in the droplets, is generally employed.

Further, though the shape, the material, or the like of substance forming a smooth and flat surface is not particularly limited, a belt made of stainless steel or plastic, or the like is usually employed.

In FIG. 1, (1) is an apparatus for forming uniform droplets. Liquid to be formed into droplets is transmitted from the inlet for the liquid (5) to the cylinder (2), and if jetted through the nozzle (4), usually having a round shape orifice, in the form of uniform droplets while given a cyclic turbulences at a constant frequency, the turbulences being transmitted from a vibration generator (3) such as magnetostrictive vibrator. Each of the droplets jetted from the orifice is electrified by an electrode (6).

The droplets collide with the flat and smooth surface of the belt (7) to become a discoid form after falling for a suitable distance. Then the droplets formed into a discoid form are immersed in the coagulating liquid (8), and are collected as discoid particles. The surface of the belt (7) is dried with the dryer (9) and again used as a surface with which droplets collide.

The ratio of thickness and diameter of the discoid particle is controlled by the viscosity of the droplets, surface tension of the droplets or the time for coagulating the droplets. The thickness/diameter ratio becomes small as the viscosity and surface tension of the droplets becomes low and the time for coagulating the droplets becomes long.

The shape of the surface of the discoid particles, particularly around the periphery is changed according to the relationship between the surface tension of the droplets and the surface tension of the surface of the belt (7), i.e. the wet tendency of the droplets to the surface of the belt (7). When the surface tension of the surface of the belt (7) is high and the droplets is well wet to the surface of the belt (7), the shape of the periphery of the discoid particle is sharp. On the other hand, when the surface tension of the surface of the belt (7) is low and the droplets is not well wet to the plate (7), the shape of the periphery of the discoid particle is roundish. As a surface of the belt liable to be wet for the droplets, for instance, a metallic plate is employed. As a surface of the belt not liable to be wet for the droplets, for instance, a plastic film or a metallic plate laminated with a plastic film is employed.

In order to coagulating the droplets adhered to the surface of the belt (7), the solvent of the droplets may be evaporated, or the droplets may be contacted with the coagulating liquid (8) as shown in FIG. 1.

According to the above process, uniform discoid particles wherein each particle has a diameter of 20 to 2,000 $\mu$m and a thickness/diameter ratio of $\frac{1}{2}$ to 1/50, and 80 to 100% of the whole particles have a diameter within the range of 0.5 to 2 times, preferably ±20% of the number average diameter of the whole particles.

The thus obtained discoid particle has a surface area about 2 to 6 times that of conventional spherical particle.

The present invention is more specifically described and explained by means of the following Example. It is to be understood that the present invention is not limited to the Example and various changes and modifications may be made in the invention without departing from the spirit and scope thereof.

EXAMPLE 1

Cellulose acetate (degree of acetylation: 61.5%) was dissolved in a mixture of dimethyl sulfoxide and propylene glycol mixed at a weight ratio of 6:4 to prepare a polymer solution having a cellulose acetate concentration of 5% by weight. The obtained solution had a viscosity of 52 cP at 90° C. The surface tension of the mixed solvent was 39 dyn/cm, which is the arithmetical mean value of the surface tension at 25° C.

By using the above-obtained solution and an apparatus as shown in FIG. 1, a particulate material was prepared.

The solution was transmitted into the cylinder (2), which is maintained at 90° C., at a constant flow rate, and the solution was jetted from a round shape orifice having a pore diameter of 50 $\mu$m, of the nozzle (4) at a linear velocity rate of 18 m/sec while given a cyclic vibration having a frequency of 25 KHz by a vibrating rod (not shown in FIG. 1) connected with the vibration generator (3).

The synchronized condition was attained with the above parameter's values. The solution jetted from the orifice formed uniform droplets having a diameter of about 100 $\mu$m.

In order to electrify the droplets with minus charge for the purpose of preventing the collision and reconnection of the droplets, parallel plate electrodes having a width of 20 mm and a distance between the plates of 10 mm was set at the position of about 2 mm from the lower face of the nozzle (4), and a voltage of 500 V was given to the electrodes.

The flying rate of the droplets rapidly decreased as going away from the nozzle (4). The droplets were adhered to the belt (7) made of stainless steel having a width of 50 cm, the belt being set at the position of about 50 cm below the nozzle (4) and grounded (not shown in FIG. 1). The belt was run at 25 m/min and the droplets adhered thereto was let into water as a coagulating liquid (8) after about 5 seconds from their adhesion to give discoid particles.

The obtained discoid particles was observed by means of an optical microscope at a magnification of 100 x to find that the obtained particles were in an almost uniform discoid form, the number average diameter thereof was 190 $\mu$m, not less than 90% of the whole particles had a diameter of 0.8 to 1.2 times the number average particle size, and the maxium thickness was about 20 $\mu$m.

In addition to the ingredients used in the Example, other ingredients can be used in the Example as set forth in the specification to obtain substantially the same results.

What we claim is:

1. A process for preparing uniform discoid particles, wherein each particle has a diameter of 20 to 2,000 $\mu$m and a thickness/diameter ratio of $\frac{1}{2}$ to 1/50, and not less than 80% of the whole particles have a diameter within the range of 0.5 to 2 times the number average diameter, which comprises jetting a solution in the form of uniform droplets with electric charges with a same sign, the solution containing at least one member selected from the group consisting of a natural high molecular substance, a synthetic high molecular substance, an inorganic compound and an organometal compound, and having a viscosity of 20 to 2,000 cP, from an orifice into a gas atmosphere at a constant flow rate while applying cyclic turbulences having a constant frequency to the solution;

letting the droplets adhere to a flat and smooth surface before the droplets coagulate; and coagulating the droplets adhered to the surface by subjecting the droplets to the drying or to the contact with a coagulating liquid.

2. The process of claim 1, wherein said flat and smooth surface has the electric charge opposite to that of droplets or is grounded.

* * * * *